(12) United States Patent
MacFarlane et al.

(10) Patent No.: US 10,746,188 B2
(45) Date of Patent: Aug. 18, 2020

(54) INTER-SHAFT BEARING CONNECTED TO A COMPRESSOR BOOST SYSTEM

(71) Applicant: PRATT & WHITNEY CANADA CORP., Longueuil (CA)

(72) Inventors: Ian A. MacFarlane, St-Bruno-De-Montarville (CA); Sean Powers, Candiac (CA); Martin Poulin, Mont Saint-Hilaire (CA); Jean-Jacques Forest, Verdun (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 614 days.

(21) Appl. No.: 15/483,174

(22) Filed: Apr. 10, 2017

(65) Prior Publication Data

US 2018/0266429 A1    Sep. 20, 2018

Related U.S. Application Data

(60) Provisional application No. 62/471,018, filed on Mar. 14, 2017.

(51) Int. Cl.
*F04D 29/054* (2006.01)
*F02C 7/06* (2006.01)
(Continued)

(52) U.S. Cl.
CPC ........... *F04D 29/054* (2013.01); *F01D 5/026* (2013.01); *F01D 25/16* (2013.01); *F01D 25/18* (2013.01);
(Continued)

(58) Field of Classification Search
CPC .... F02C 3/08; F02C 3/10; F02C 3/107; F02C 3/113; F02C 3/145; F02C 7/32;
(Continued)

(56) References Cited

U.S. PATENT DOCUMENTS 2,548,975 A    4/1951   Hawthorne
2,747,367 A    5/1956   Savin
(Continued)

FOREIGN PATENT DOCUMENTS

CA    2562290 C    10/2013
CA    2970386       1/2018
(Continued)

OTHER PUBLICATIONS

European Search Report dated Jul. 2, 2018 in relating EP application No. °18154161.6.
(Continued)

*Primary Examiner* — Patrick Hamo
*Assistant Examiner* — Chirag Jariwala
(74) *Attorney, Agent, or Firm* — Norton Rose Fulbright Canada LLP

(57) ABSTRACT

A multi-spool gas turbine engine comprises a low pressure (LP) spool and a high pressure (HP) spool. The LP spool has an LP shaft for transferring a torque from an LP turbine to an LP compressor. The HP spool has an HP shaft for transferring a torque from an HP turbine to an HP compressor. The LP shaft is coaxially mounted inside the HP shaft. An inter-shaft bearing is mounted radially between the LP shaft and the HP shaft. The inter-shaft bearing is disposed axially between the HP compressor and the LP compressor.

21 Claims, 2 Drawing Sheets

(51) Int. Cl.
*F04D 29/32* (2006.01)
*F01D 25/18* (2006.01)
*F01D 5/02* (2006.01)
*F01D 25/16* (2006.01)

(52) U.S. Cl.
CPC .............. *F02C 7/06* (2013.01); *F04D 29/321* (2013.01); *F05D 2240/50* (2013.01); *F05D 2240/60* (2013.01); *F05D 2260/4031* (2013.01); *Y02T 50/671* (2013.01)

(58) Field of Classification Search
CPC ...... F02C 7/36; F02C 7/06; F02K 3/02; F02K 3/06; F02K 3/065; F01D 5/026; F01D 5/10; F01D 13/006; F01D 15/12; F01D 25/04; F01D 25/16; F01D 25/18; F01D 25/183; F01D 2220/32; F01D 2220/323; F01D 2240/53; F01D 2240/54; F01D 2240/55; F01D 2240/60; F01D 2240/61; F01D 2240/63; F01D 2260/4031; F01D 2260/96; F04D 19/026; F04D 19/044; F04D 19/054; F04D 29/044; F04D 29/053; F04D 29/054; F04D 29/321; B64D 35/04; B64D 27/10; Y02T 50/671; F05D 2220/32; F05D 2220/323; F05D 2220/324; F05D 2220/329; F05D 2230/70; F05D 2230/72; F05D 2240/61; F05D 2250/36; F05D 2260/31; F05D 2260/36; F05D 2260/40; F05D 2260/4031; F05D 2260/40311; F05D 2240/50; F05D 2240/53; F05D 2240/54; F05D 2240/55; F05D 2240/60; F05D 2240/63; F05D 2260/96
See application file for complete search history.

(56) References Cited

U.S. PATENT DOCUMENTS

| | | | |
|---|---|---|---|
| 2,929,207 A | 3/1960 | Peterson | |
| 2,955,424 A | 10/1960 | Hyniszak | |
| 2,984,977 A | 5/1961 | Embree | |
| 3,152,443 A | 10/1964 | Newland | |
| 3,170,292 A | 2/1965 | Howes | |
| 3,204,406 A | 9/1965 | Howes | |
| 3,209,536 A | 10/1965 | Howes | |
| 3,255,825 A | 6/1966 | Mouille et al. | |
| 3,488,947 A | 1/1970 | Miller | |
| 3,529,419 A | 9/1970 | Reed | |
| 3,762,161 A | 10/1973 | Pennig | |
| 3,874,811 A | 4/1975 | Dennison | |
| 4,055,949 A * | 11/1977 | Boudigues | F02K 3/04 60/269 |
| 4,141,212 A | 2/1979 | Koschier | |
| 4,251,987 A | 2/1981 | Adamson | |
| 4,498,291 A | 2/1985 | Jefferey | |
| 4,531,694 A | 7/1985 | Soloy | |
| 4,611,464 A | 9/1986 | Hetzer et al. | |
| 4,685,286 A | 8/1987 | Hetzer et al. | |
| 4,815,282 A | 3/1989 | Wilkinson et al. | |
| 4,817,382 A | 4/1989 | Rudolph et al. | |
| 4,864,812 A | 9/1989 | Rodgers | |
| 4,884,903 A * | 12/1989 | Pham | F01D 25/164 384/563 |
| 5,119,624 A | 6/1992 | McKenna | |
| 5,159,808 A | 11/1992 | Kast | |
| 5,161,364 A | 11/1992 | Bruun | |
| 5,309,708 A | 5/1994 | Stewart | |
| 6,041,589 A | 3/2000 | Giffin, III et al. | |
| 6,082,967 A | 7/2000 | Loisy | |
| 6,247,668 B1 | 6/2001 | Reysa | |
| 6,735,954 B2 | 5/2004 | MacFarlane et al. | |
| 6,855,089 B2 | 2/2005 | Poulin | |
| 6,865,891 B2 * | 3/2005 | Walsh | F01D 17/162 60/39.25 |
| 6,895,741 B2 | 5/2005 | Rago et al. | |
| 6,901,759 B2 | 6/2005 | Frutschi | |
| 7,055,303 B2 | 6/2006 | Macfarlane et al. | |
| 7,144,349 B2 | 12/2006 | Mitrovic | |
| 7,168,913 B2 | 1/2007 | Lardellier | |
| 7,500,365 B2 | 3/2009 | Suciu et al. | |
| 7,552,591 B2 | 6/2009 | Bart et al. | |
| 7,690,185 B2 | 4/2010 | Linet et al. | |
| 7,698,884 B2 | 4/2010 | Maguire et al. | |
| 7,707,909 B2 | 5/2010 | Linet et al. | |
| 7,758,302 B2 | 7/2010 | Linet et al. | |
| 7,762,084 B2 | 7/2010 | Martis | |
| 7,832,193 B2 | 11/2010 | Orlando et al. | |
| 7,926,259 B2 | 4/2011 | Orlando et al. | |
| 8,176,725 B2 | 5/2012 | Norris | |
| 8,209,952 B2 | 7/2012 | Ress, Jr. | |
| 8,220,245 B1 | 7/2012 | Papandreas | |
| 8,350,398 B2 | 1/2013 | Butt | |
| 8,459,038 B1 | 6/2013 | Lickfold | |
| 8,464,511 B1 | 6/2013 | Ribarov et al. | |
| 8,500,583 B2 | 8/2013 | Goi et al. | |
| 8,516,789 B2 | 8/2013 | Kupratis | |
| 8,568,089 B2 | 10/2013 | Lemmers, Jr. et al. | |
| 8,621,871 B2 | 1/2014 | McCune et al. | |
| 8,789,354 B2 * | 7/2014 | Suciu | F02K 3/025 60/226.1 |
| 8,794,922 B2 | 8/2014 | Bart et al. | |
| 8,853,878 B1 | 10/2014 | White | |
| 9,022,684 B2 * | 5/2015 | Coffin | F16D 1/033 403/296 |
| 9,062,611 B2 | 6/2015 | Sheridan | |
| 9,126,691 B2 | 9/2015 | Cloft | |
| 9,145,834 B2 | 9/2015 | Frost et al. | |
| 9,239,004 B2 | 1/2016 | Kupratis | |
| 9,297,305 B2 | 3/2016 | Drachsler et al. | |
| 9,322,341 B2 | 4/2016 | Belleville | |
| 9,328,667 B2 | 5/2016 | MacFarlane | |
| 9,341,121 B2 | 5/2016 | Kupratis | |
| 9,353,848 B2 | 5/2016 | Blewett et al. | |
| 9,512,784 B2 | 12/2016 | Morgan et al. | |
| 9,828,911 B2 | 1/2017 | Burghardt | |
| 9,719,465 B2 | 8/2017 | Suciu | |
| 9,745,860 B1 | 8/2017 | Haskin | |
| 9,752,500 B2 | 9/2017 | Ullyott | |
| 9,784,182 B2 | 10/2017 | Dhanuka | |
| 9,819,292 B2 | 11/2017 | Thatcher | |
| 9,890,704 B2 | 2/2018 | Speak et al. | |
| 9,926,849 B2 | 3/2018 | Frost et al. | |
| 9,932,858 B2 | 4/2018 | Miller | |
| 10,054,001 B2 | 8/2018 | Beutin et al. | |
| 10,072,570 B2 | 9/2018 | Kupratis | |
| 10,094,295 B2 | 10/2018 | Ullyott et al. | |
| 10,125,722 B2 | 11/2018 | Kupratis | |
| 2005/0060983 A1 * | 3/2005 | Lardellier | F02K 1/48 60/226.1 |
| 2006/0010152 A1 | 1/2006 | Catalano | |
| 2006/0137355 A1 | 6/2006 | Welch et al. | |
| 2007/0240427 A1 | 10/2007 | Ullyott | |
| 2008/0081733 A1 | 4/2008 | Hattenbach | |
| 2008/0138195 A1 | 6/2008 | Kern | |
| 2008/0148881 A1 | 6/2008 | Moniz et al. | |
| 2009/0015011 A1 * | 1/2009 | Colin | F01D 15/10 290/52 |
| 2009/0188334 A1 | 7/2009 | Merry | |
| 2009/0288421 A1 | 11/2009 | Zeiner | |
| 2009/0322088 A1 | 12/2009 | Dooley | |
| 2010/0164234 A1 | 7/2010 | Bowman | |
| 2010/0180568 A1 | 7/2010 | Sachs | |
| 2010/0212285 A1 | 8/2010 | Negulescu | |
| 2010/0281875 A1 | 11/2010 | Price | |
| 2011/0056208 A1 * | 3/2011 | Norris | F02C 3/107 60/772 |
| 2011/0171030 A1 | 7/2011 | Swift | |
| 2011/0284328 A1 | 11/2011 | Brandt | |
| 2013/0031912 A1 | 2/2013 | Finney | |
| 2013/0056982 A1 | 3/2013 | Gozdawa | |

(56) References Cited

U.S. PATENT DOCUMENTS

| | | |
|---|---|---|
| 2013/0098066 A1 | 4/2013 | Gallet |
| 2013/0139518 A1 | 6/2013 | Morgan |
| 2013/0145769 A1 | 6/2013 | Norris |
| 2013/0186058 A1 | 7/2013 | Sheridan |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0150401 A1 | 6/2014 | Venter |
| 2014/0250862 A1 | 9/2014 | Suciu et al. |
| 2014/0252160 A1 | 9/2014 | Suciu et al. |
| 2014/0255147 A1 * | 9/2014 | Root .............. F01D 25/285 415/1 |
| 2014/0256494 A1 | 9/2014 | Lewis |
| 2014/0260295 A1 | 9/2014 | Ullyott |
| 2014/0290265 A1 | 10/2014 | Ullyott et al. |
| 2014/0297155 A1 | 10/2014 | Chen |
| 2015/0013307 A1 | 1/2015 | Burghardt |
| 2015/0150401 A1 | 6/2015 | Bennett |
| 2015/0167549 A1 | 6/2015 | Ribarov |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 | 2/2016 | Frost |
| 2016/0090871 A1 | 3/2016 | Olsen |
| 2016/0130949 A1 * | 5/2016 | Morin .............. F01D 15/12 416/120 |
| 2016/0169118 A1 | 6/2016 | Duong |
| 2016/0201490 A1 | 7/2016 | Scott |
| 2016/0208690 A1 | 7/2016 | Zimmitti |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0319845 A1 | 11/2016 | Molnar |
| 2016/0333791 A1 | 11/2016 | Snyder et al. |
| 2016/0341214 A1 | 11/2016 | O'Toole |
| 2016/0363055 A1 | 12/2016 | Edwards |
| 2017/0108084 A1 | 4/2017 | Chmylkowski |
| 2017/0122122 A1 | 5/2017 | Lepretre |
| 2017/0211477 A1 | 7/2017 | Menheere |
| 2017/0211484 A1 | 7/2017 | Sheridan |
| 2017/0191413 A1 | 8/2017 | Haskin |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey |
| 2018/0016989 A1 | 1/2018 | Abe |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0135522 A1 | 5/2018 | Mitrovic et al. |
| 2018/0149091 A1 | 5/2018 | Howell et al. |
| 2018/0163640 A1 | 6/2018 | Dubreuil |
| 2018/0171815 A1 | 6/2018 | Suciu et al. |
| 2018/0172012 A1 | 6/2018 | Plante |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| RU | 2328610 C2 * | 7/2008 |
| WO | WO95/052120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

European Search dated Nov. 30, 2017 in counterpart EP application No. 17182102.8.

European Search Report dated Dec. 12, 2017 in related EP application No. 17182076.4.

European Search Report dated Dec. 12, 2017 in related EP application No. 17182096.2.

European Search dated Jan. 31, 2018 in related EP application No. 17185796.4.

A New Approach to Turboshaft Engine Growth, M. A. Compagnon, General Electric Company, Lynn,Massachusetts pp. 80-41-1 to 80-41-6, May 13, 1980.

European Search Report dated Mar. 19, 2018 in related EP application No. 17182087.1.

European Search Report dated Mar. 21, 2018 in related EP application No. 17182094.7.

European Search Report dated Apr. 6, 2018 in related EP application No. 17193893.9.

European Search Report dated May 25, 2018 in related EP application No. 17191309.8.

European Search Report dated May 25, 2018 in related EP application No. 17186249.3.

\* cited by examiner

INTER-SHAFT BEARING CONNECTED TO A COMPRESSOR BOOST SYSTEM

CROSS-REFERENCE TO RELATED APPLICATION

This application claims priority from U.S. provisional patent application No. 62/471,018, filed Mar. 14, 2017, the entire contents of each of which is incorporated by reference herein.

TECHNICAL FIELD

The application relates generally to gas turbine engines and, more particularly, to a multi-spool engine architecture with an inter-shaft bearing arrangement.

BACKGROUND OF THE ART

Gas turbine engine shafts are typically supported at opposed ends thereof by bearings. Long shafts may be susceptible of bending during operation, and therefore improvement is needed.

SUMMARY

In one aspect, there is provided a gas turbine engine comprising: a compressor section, the compressor section including a low pressure (LP) compressor and a high pressure (HP) compressor; a combustor in fluid communication with the compressor section; a turbine section in fluid communication with the combustor, the turbine section including an LP turbine and an HP turbine; an LP shaft drivingly connecting the LP turbine to the LP compressor; an HP shaft drivingly connecting the HP turbine to the HP compressor, the LP shaft extending axially inside the HP shaft; and an inter-shaft bearing mounted in an annular space between the HP shaft and LP shaft, the inter-shaft bearing disposed axially between the HP compressor and the LP compressor.

In another aspect, there is provided a multi-spool gas turbine engine comprising: a low pressure (LP) spool; a high pressure (HP) spool, the LP spool and the HP spool being independently rotatable about an engine axis; the LP spool comprising an LP shaft for transferring a torque from an LP turbine to an LP compressor, the HP spool comprising an HP shaft for transferring a torque from an HP turbine to an HP compressor; the LP shaft being coaxially mounted inside the HP shaft, and an inter-shaft bearing mounted radially between the LP shaft and the HP shaft, the inter-shaft bearing being disposed axially between the HP compressor and the LP compressor.

In accordance with another aspect, there is provided a multi-spool gas turbine engine comprising: a low pressure (LP) spool; a high pressure (HP) spool, the LP spool and the HP spool rotatable independently of one another about an engine axis; the LP pressure spool comprising an LP compressor, an LP turbine and an LP shaft for transferring a torque from the LP turbine to the LP compressor; the HP spool comprising an HP turbine and an HP compressor; an accessory gear box (AGB) drivingly connected to the HP spool via an AGB input shaft, the LP shaft extending axially inside the AGB input shaft, the LP compressor disposed axially between the HP compressor and the AGB, and an inter-shaft bearing radially between the LP shaft and the AGB input shaft.

DESCRIPTION OF THE DRAWINGS

Reference is now made to the accompanying figures in which.

DETAILED DESCRIPTION

Figure 1:
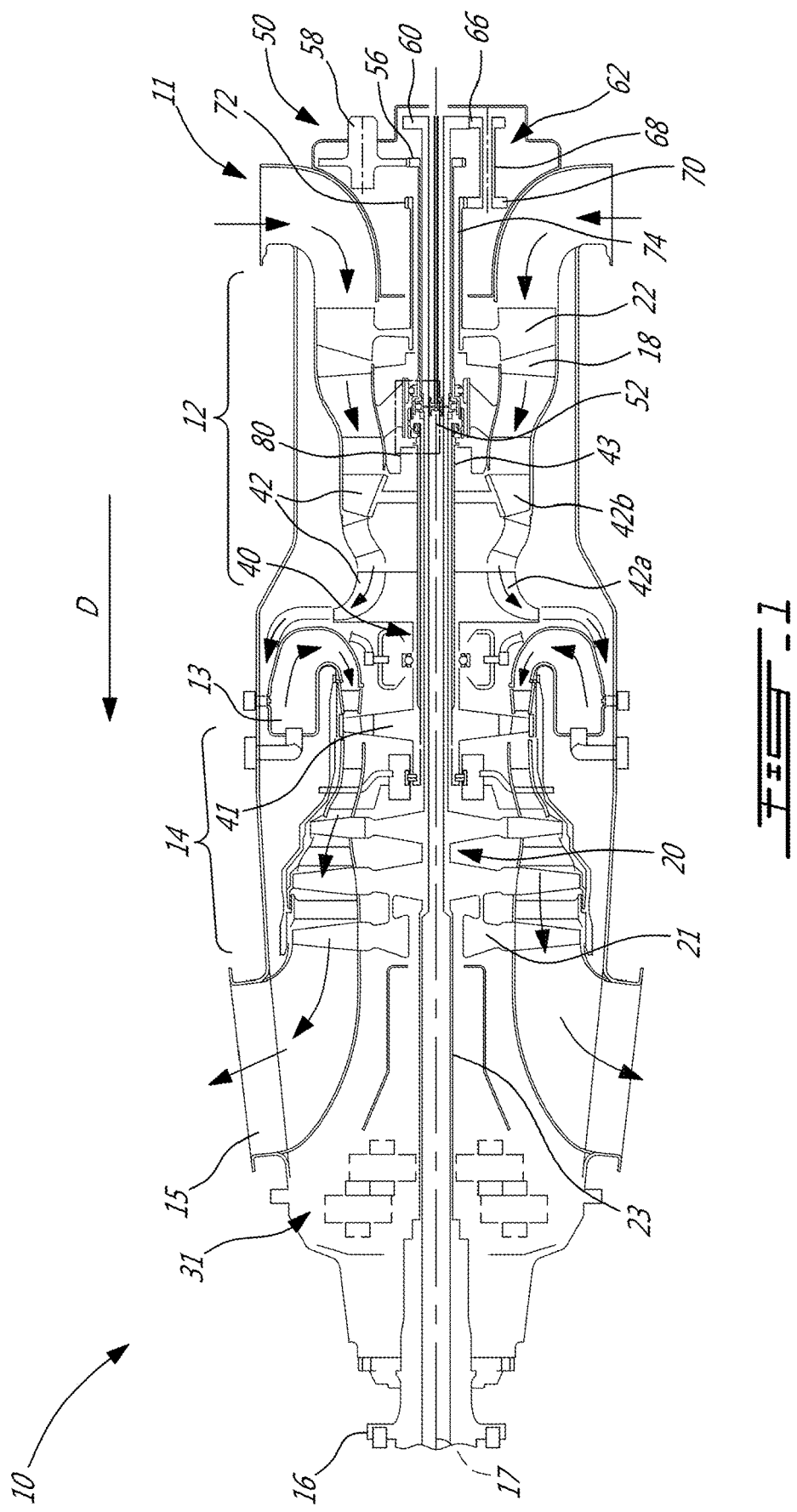
FIG. 1 is a schematic cross-section view of a multi-spool gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The rotatable load can, for instance, take the form of a propeller or a rotor, such as a helicopter main rotor. Depending on the intended use, the engine 10 can, for instance, be configured as a turboprop engine or a turboshaft engine. FIG. 1 illustrates a turboprop configuration. The gas turbine engine 10 has a centerline or longitudinal center axis 17 about which the compressor and turbine rotors rotate.

The gas turbine engine 10 has an axially extending central core which defines a gaspath 18 through which gases flow, as depicted by flow arrows in FIG. 1. The exemplary embodiment shown in FIG. 1 is a "reverse-flow" engine because gases flow through the gaspath 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gaspath 18 of the engine 10 disclosed herein can be better appreciated by considering that the gases flow through the gaspath 18 in the same direction D as the one along which an aircraft engine travels during flight. Stated differently, in the non-limitative example shown in FIG. 1, gases flow through the engine 10 from a rear end thereof towards the output shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about axis 17. The term "spool" is herein intended to broadly refer to drivingly connected turbine and compressor rotors and is, thus, not limited to a compressor and turbine assembly on a single shaft. As will be seen hereinbelow, it also includes a rotary assembly with multiple shafts geared together.

The LP spool 20 includes at least one component to compress the air that is part of the compressor section 12, and at least one component to extract energy from the combustion gases that is part of the turbine section 14. More particularly, the LP spool 20 has an LP turbine 21, also known as a power turbine, which may include different number of stages (three stages in the illustrated embodiment), and which drives an LP compressor 22 (also referred to as a boost). The LP turbine 21 drives the LP compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the center axis 17. In the depicted embodiment, both the LP turbine 21 and the LP compressor 22 include rotatable components having an axis of rotation that is coaxial with the center axis 17. It is understood that they may include one or more stages depending upon the desired engine thermodynamic cycle.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises an LP shaft 23 coaxial with engine axis 17. The LP turbine 21 is drivingly connected to the LP shaft 23. The LP shaft 23 allows the LP turbine 21 to drive the LP compressor 22 during operation of the engine 10. As will be discussed in greater details hereinbelow, the LP shaft 23 may be drivingly coupled to the LP compressor 22 via a gear train, thereby allowing the LP compressor 22 to run at a different rotational speed from the LP turbine 21. This can provide more flexibility in the selection of design points for the LP compressor 22 while at the same time allowing to drivingly connect an axially mounted accessory gear box (AGB) to the HP spool 40 centrally through the LP compressor 22, thereby minimizing the engine envelope in a direction radial from the engine axis 17 as compared to conventional boosted engine with side-mounted AGBs driven via a tower shaft.

Still referring to FIG. 1, it can be appreciated that the LP shaft 23 extends axially forwardly from the LP turbine 21 for driving the output shaft 16. The LP shaft 23 is drivingly connected to the output shaft 16 via a suitable reduction gear box (RGB) 31. A rotatable load, a propeller (not shown) according to the illustrated example, is connectable to a front end of the output shaft 16. In this way, the LP turbine 21 can be used to drive the rotatable load (e.g. the propeller) at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP shaft 23, the RGB 31 and the output shaft 16 coming out forwardly from the RGB 31. The rotatable load can therefore be any suitable component, or any combination of suitable components, that is capable of receiving the rotational drive from the LP turbine section 21.

The RGB 31 processes and outputs the rotational drive transferred thereto from the LP turbine 21 via the LP shaft 23 through known gear reduction techniques. The RGB 31 allows for the load (e.g. the propeller according to the illustrated turboprop example) to be driven at its optimal rotational speed, which is different from the rotational speed of the LP turbine 21. The RGB 31 is axially mounted at the front end of the engine 10. The RGB 31 has an input and an output axis parallel (coaxial in the illustrated embodiment) to the central axis 17 of the engine 10.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the LP shaft 23.

The LP shaft 23 with the portions thereof extending forward and aft of the LP turbine 21 provides the engine 10 with bidirectional drive. Modularity criteria for gas turbine engines may motivate the use of distinct shaft sections in opposed axial directions from the LP turbine 21. The LP shaft sections may be directly or indirectly connected together. Alternately, as shown in FIG. 1, the LP shaft 23 can be integral with a first portion of the LP shaft extending axially rearwardly from the LP turbine 21, and a second portion (a power turbine segment) extending between the RGB 31 and the LP turbine 21 forwardly from the LP turbine 21. Whether the LP shaft 23 is integral or segmented, the LP turbine 21 provides rotational drive outputted at each end of the LP shaft 23.

According to the non-limiting embodiment illustrated in FIG. 1, the LP shaft 23 is a one piece shaft and extends axially through a central bore of the LP compressor 22 to a location aft of the LP compressor 22 for connection with an axially mounted boost gear train disposed on an aft facing side of the LP compressor 22, as will discussed in further details hereinbelow. The use of such a one piece LP shaft 23 may allow the shaft to be introduced in the engine at the end of the assembly process in a single operation, thereby simplifying the assembly procedure.

However, it is understood that the LP shaft 23 is not limited to the configuration depicted in FIG. 1. As mentioned above, instead of being provided in the form of a one piece through shaft, it could be divided into serially interconnectable sections.

In light of the preceding, it can be appreciated that the LP turbine 21 drives both the rotatable load and the LP compressor 22. Furthermore, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g. propeller, RGB 31, etc.) as well as to drive elements to the rear of the LP turbine (e.g. LP compressor 22). This configuration of the LP turbine 21 allows it to simultaneously drive the rotatable load and the LP compressor 22.

Still referring to FIG. 1, the HP spool 40 has at least one component to compress the air that is part of the compressor section 12, and at least one component to extract energy from the combustion gases that is part of the turbine section 14. The HP spool 40 is also disposed along the axis 17 and includes an HP turbine 41 (also referred to as the compressor turbine) drivingly engaged (e.g. directly connected) to an HP compressor 42 by an HP shaft 43 rotating independently of the LP shaft 23. In the illustrated embodiment, the HP shaft 43 is a hollow shaft which rotates around the LP shaft 23. That is the LP shaft 23 extends axially through the HP shaft 43. The HP turbine 41 and the HP compressor 42 may include one or more stages of rotors, depending upon the desired engine thermodynamic cycle, for example. In the depicted embodiment, the HP compressor 42 includes a centrifugal compressor 42a or impeller and an axial compressor 42b, both of which are driven by the HP turbine 41. During operation of the engine 10, torque is transferred from HP turbine 41 to the HP compressor 42 via HP shaft 43.

In the exemplified reverse flow engine configuration, the HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41. This arrangement provides for a boosted reverse flow engine.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

The LP turbine 21 is sometimes referred to as the "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP shaft 43 extends concentrically about the LP shaft 23 and is independently rotatable relative thereto. The relative rotation between the HP shaft 43 and the LP shaft 23 allow the shafts 23, 43 to rotate at different rotational speeds, thereby allowing the HP compressor 42 and the LP compressor 22 to rotate at different rotational speeds.

Still referring to the embodiment shown in FIG. 1, the engine 10 also includes an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10.

According to the illustrated embodiment, the AGB 50 is disposed axially sequentially after the LP compressor 22. More particularly, the AGB 50 is concentrically mounted axially aft of the LP compressor 22 as an axial extension of the engine envelope. The axial positioning of the AGB 50 allows minimizing the overall radial envelope of the engine as compared to a split compressor or boosted engine having the AGB mounted on a side of the engine and connected to the HP spool via a tower shaft. In the illustrated embodiment, the AGB 50 is accommodated within the envelope of the engine in a plane normal to the central axis 17.

In the illustrated embodiment, the AGB input drive axis is coaxial to the LP compressor centerline and, thus, the engine axis 17. By so aligning the input axis of the AGB 50 relative to the LP compressor centerline, the drive input to the AGB 50 can be provided centrally through the LP compressor 22, thereby eliminating the need for a tower shaft and an externally mounted gear arrangement. However, unlike conventional reverse flow engines (like the well-known PT6 engine manufactured by Pratt & Whitney Canada), which do not include a compressor boost, the presence of the LP compressor 22 axially between the HP compressor 42 and the AGB 50 physically interferes with the connection of the AGB 50 with the HP spool 40, which is disposed on the opposed axially facing side of the LP compressor 22. In the illustrated embodiment, this particular problem is overcome by extending the HP shaft 43 through a central bore or passage in the LP compressor 22. The HP shaft 43 thus provides a drive input to the AGB 50 coaxial to the engine axis 17.

According to the illustrated embodiment, the HP shaft 43 is segmented between the HP compressor 42 and the LP compressor 22. More particularly, the HP shaft 43 comprises a first segment 43a and a second segment 43b. The first segment 43a extends axially between the HP turbine 41 and the HP compressor rotor 42b. The first shaft segment 43a transfers a driving torque from the HP turbine 41 to the HP compressor 42. It can thus be viewed as an HP compressor drive shaft. The second shaft segment 43b is an HP shaft extension to provide a drive input to the AGB 50 (it is an AGB input shaft). The second shaft segment 43b extends axially centrally through the LP compressor 22 into the AGB 50 to transfer a drive torque from the HP spool 40 to the AGB 50. The second shaft segment 43b is drivingly coupled to the first shaft segment 43a by a coupling 53, thereby allowing a torque to be transferred from the first segment 43a to the second segment 43b. The coupling 53 may, for instance, be provided in the form of a sleeve or a tubular shaft with internal axial splines 53a, 53b at opposed ends thereof for engagement with corresponding splines or teeth 55a, 55b at the adjacent ends of the first and second shaft segments 43a, 43b. However, it is understood that the coupling 53 can adopt other suitable configurations as long as it allows for a torque to be transferred from the first segment 43a to the second segment 43b.

Figure 2:
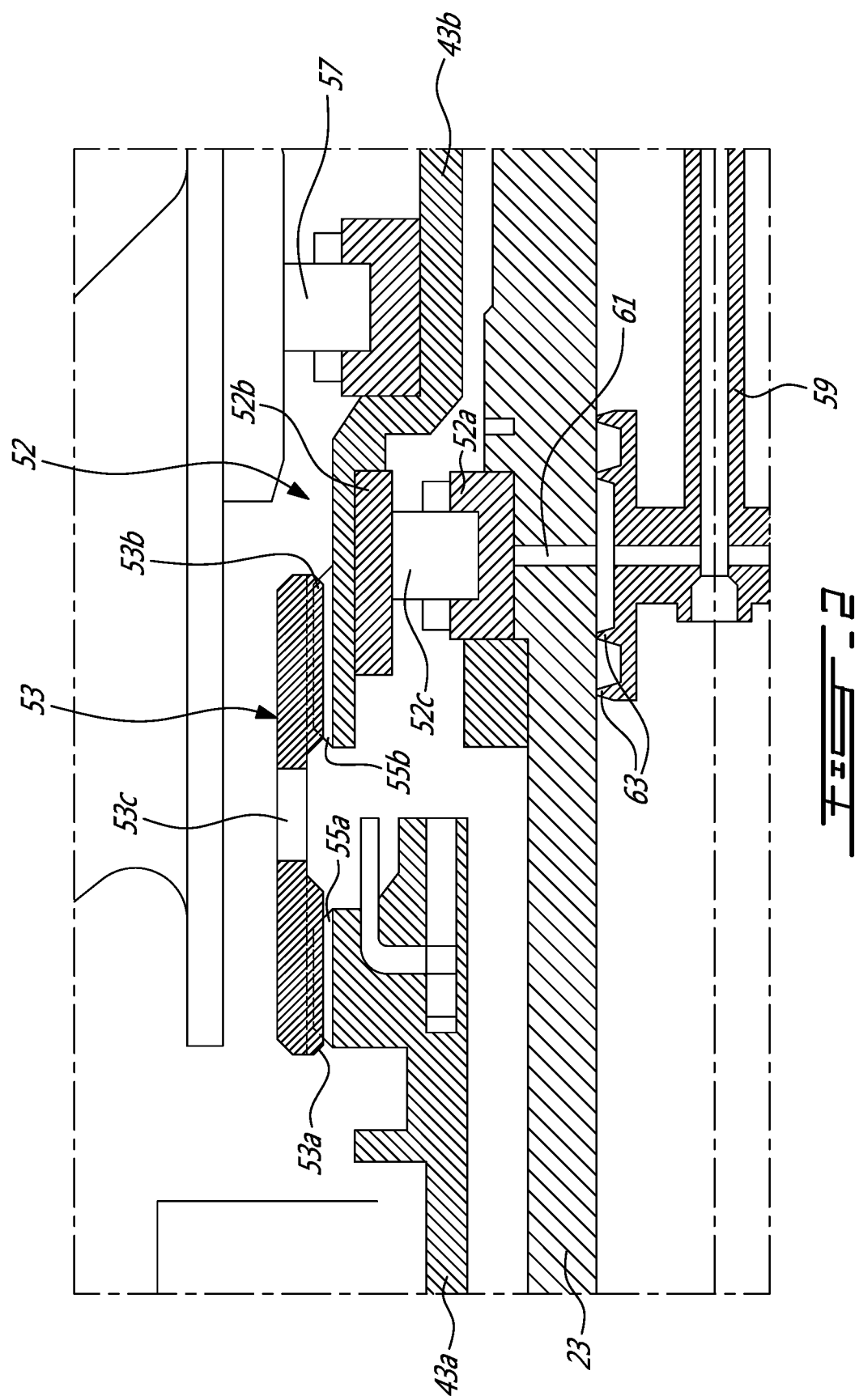
FIG. 2 is an enlarged cross-section of the engine shown in FIG. 1 and illustrating an inter-shaft bearing installed in an annular space between a low pressure (LP) shaft and a high pressure HP shaft axially between an HP compressor and an LP compressor.

As shown in FIG. 2, the coupling 53 allows for the placement of an inter-shaft bearing 52 between the HP compressor 42 and the LP compressor 22 to provide support to the LP shaft 23 and address specific shaft dynamic requirements. Indeed, due to the overall engine architecture, the LP shaft 23 is relatively long and therefore needs to be supported between the opposed ends thereof by a mid-bearing or the like. The inter-shaft bearing 52 acts as that support. As can be appreciated from FIG. 2, the inter-shaft bearing 52 is mounted in an annular space between the second segment 43b of the HP shaft 43 and the LP shaft 23. In one aspect, the coupling 53 may be flexible to decouple the first shaft segment 43a of the HP shaft 43 and, thus, the HP compressor 42 from the vibrations transferred from the LP shaft 23 to the inter-shaft bearing 52 and to the second shaft segment 43b of the HP shaft 43. That is the coupling 53 may be designed to "shield" the HP compressor 42 from the LP shaft vibrations. In other words, a flexible coupling may be used to "break" the load path between the inter-shaft bearing 52 and the HP compressor 42, thereby preventing the vibrations of the LP shaft 23 from being transferred to the HP compressor 42 via the inter-shaft bearing 52. To that end, the splines 53a, 53b may be crowned to provide for the required flexibility between the first and second shaft segments 43a, 43b. Other flexible coupling arrangements are contemplated as well.

With the use of a flexible coupling, the LP shaft vibrations are only transferred to the second segment 43b of the HP shaft 43, which is a small shaft that does not support any rotors. A bearing 57 is provided on the outside diameter of the second shaft segment 43b to support the same. The bearing 57 is mounted to a static structure, such as, the compressor casing.

An oil transfer tube 59 may be mounted inside the LP shaft 23 to feed the inter-shaft bearing 52 with oil. A radial hole 61 may be defined through the LP shaft in alignment with the inter-shaft bearing 52 for allowing the oil flowing through tube 59 to be directed radially outwardly to the inter-shaft bearing 52. The oil feed tube 59 is connected to a suitable source of oil. In the illustrated embodiment, the tube 59 extends to the AGB 50 and is in fluid communication with the AGB oil supply. The oil feed tube 59 may be mounted for joint rotation with the LP shaft 23. Seals 63 are provided at the interface with the LP shaft hole 61. Also a hole 53c may be defined in the coupling 53 to evacuate oil from the bearing 52. It is noted that the oil could also be brought by an oil jet and dam arrangement, without the need for an oil transfer tube.

According to the depicted illustrative embodiment, the inter-shaft bearing 52 is an inner diameter (ID) pilot type bearing, meaning that the primary bearing attachment occurs on its inner diameter (with its outer diameter being allowed some freedom of movement). More specifically, the inner race 52a of inter-shaft bearing 52 is secured, through a tight fit or other suitable means of attachment, to the LP shaft 23, more specifically to the outer diameter of the shaft, so that, during operation, inner race 52a rotates with the LP shaft 23. In contrast, the outer race 52b of the inter-shaft bearing 52 is allowed some freedom of movement with respect to the inner diameter of the HP shaft second segment 43b, more specifically radial freedom of movement. It is understood that the inter-shaft bearing could also be outer diameter (OD) piloted cage.

The inter-shaft bearing 52 is a rolling-element bearing, but other bearing types, which benefit from lubricant contribution during operation, are possible. The illustrated example is a roller bearing, meaning that the rolling elements placed between inner race 52a and outer race 52b are cylindrical rollers 52c. Other types of rolling-element bearing types, such as ball bearings (where the rolling elements placed between inner race and outer race are spherical balls), are possible depending on the intended application.

Referring back to FIG. 1, it can be appreciated that the HP shaft second segment or AGB drive input shaft segment 43b is provided at a distal end thereof with a gear 56, which is in meshing engagement with an associated AGB output gear 58. In the illustrated example, the AGB output gear 58 has a rotation axis parallel to the engine axis 17. The output gear 58 is drivingly connected to accessories (not shown). It is understood that the accessories gear train in the AGB 50 can adopt various configurations, including multiple outputs and different gear ratios.

Still referring to FIG. 1, it can be appreciated that a boost gear train 62 is integrated to the AGB 50 to drivingly couple the LP shaft 23 and, thus, the LP turbine 21 to the LP compressor 22. As mentioned herein above, the gear connection between the LP turbine 21 and the LP compressor 22 allows driving the LP compressor 22 at a different speed than the LP turbine 21. It can thus allow for overall thermodynamic cycle performance improvement.

The LP shaft 23 projects all the way to the aft end of the engine into the AGB 50 axially beyond the HP shaft 43 for connection with the gear train 62. The gear train 62 comprises an input gear 60 provided at the distal end portion of the LP shaft 23, the end portion which projects outwardly of the HP shaft 43. The input gear 60 is in meshing engagement with a second gear 66 mounted at an aft end of a transfer shaft 68 having a rotation axis parallel to the engine axis 17. A third gear 70 is provided at an opposed forward end of the transfer shaft 68 for meshing engagement with a fourth gear 72 provided at the distal end of an LP compressor shaft 74 projecting axially from an aft facing surface of the LP compressor 22. The LP compressor shaft 74 is a hollow shaft extending concentrically about the second segment 43b of the HP shaft 43. The LP compressor shaft 74 ends at a location forward of the HP shaft 43, to thereby allow the HP shaft 43 to be drivingly connected to gear 58. It can be appreciated that the relative lengths of the shafts 23, 43, 74 projecting into the AGB 50 allows for the various gear connections (the innermost shaft having the deepest AGB penetration).

As can be appreciated from FIG. 1, the inter-shaft bearing 52 and the coupling 53 are housed in an internal cavity 80 radially inwardly of the gaspath 18 between the HP compressor 42 and the LP compressor 22. The internal cavity 80 is bounded by the compressor inner gaspath wall. Access to bearing 52 and coupling 53 may be provided by a split casing assembly including first and second separable casing sections having an interface axially between the HP compressor 42 and the LP compressor 22.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine comprising: a compressor section, the compressor section including a low pressure (LP) compressor and a high pressure (HP) compressor; a combustor in fluid communication with the compressor section; a turbine section in fluid communication with the combustor, the turbine section including an LP turbine and an HP turbine; an LP shaft drivingly connecting the LP turbine to the LP compressor; an HP shaft drivingly connecting the HP turbine to the HP compressor, the LP shaft extending axially inside the HP shaft; and an inter-shaft bearing mounted in an annular space between the HP shaft and LP shaft, the inter-shaft bearing disposed axially between the HP compressor and the LP compressor, wherein the HP shaft comprises first and second shaft segments drivingly connected by a coupling disposed axially between the HP compressor and the LP compressor, the first shaft segment extending axially between the HP turbine and the HP compressor, wherein the LP compressor is disposed axially between the HP compressor and an accessory gearbox (AGB), and wherein the second shaft segment extends centrally through the LP compressor to provide a drive input to the AGB.

2. The gas turbine engine defined in claim 1, wherein the inter-shaft bearing comprises an oil feed tube mounted axially inside the LP shaft.

3. The gas turbine engine defined in claim 2, wherein the oil feed tube is in fluid communication with an oil circuit of the AGB.

4. The gas turbine engine defined in claim 1, wherein the inter-shaft bearing is mounted to an inner diameter of the second shaft segment.

5. The gas turbine engine defined in claim 4, wherein the coupling is a flexible coupling.

6. The gas turbine engine defined in claim 5 wherein the flexible coupling is provided with axially oriented splines at opposed ends thereof for meshing engagement with corresponding spines at adjacent ends of the first and second shaft segments.

7. The gas turbine engine defined in claim 1, wherein the engine is a reverse flow engine, the LP turbine being disposed forward of the LP compressor relative to a direction of travel of the engine, the HP compressor disposed forward of the LP compressor and in fluid communication therewith, and the HP turbine disposed aft of the LP turbine and in fluid communication therewith.

8. The gas turbine engine defined in claim 7, further comprising a gear train drivingly coupling the LP shaft to the LP compressor.

9. The gas turbine engine defined in claim 8, wherein the gear train is disposed aft of the LP compressor.

10. The gas turbine engine defined in claim 9, wherein the LP shaft extends axially through a central bore of the LP compressor and projects axially aft of the LP compressor.

11. The gas turbine engine defined in claim 10, wherein the LP shaft has a power turbine shaft portion extending forwardly of the LP turbine and an LP compressor shaft portion extending rearwardly from the LP turbine to a location aft of the LP compressor.

12. A multi-spool gas turbine engine comprising: a low pressure (LP) spool;
a high pressure (HP) spool, the LP spool and the HP spool being independently rotatable about an engine axis; the LP spool comprising an LP shaft for transferring a torque from an LP turbine to an LP compressor, the HP spool comprising an HP shaft for transferring a torque from an HP turbine to an HP compressor; the LP shaft being coaxially mounted inside the HP shaft, an inter-shaft bearing mounted radially between the LP shaft and the HP shaft, the inter-shaft bearing being disposed axially between the HP compressor and the LP compressor, a flexible coupling is provided in a load path between the inter-shaft bearing and the HP compressor, wherein the HP shaft comprises first and second shaft segments, the first shaft segment being attached to the HP compressor, the inter-shaft bearing being mounted to the second shaft segment and the flexible coupling being provided between the first and second shaft segments, and wherein the multi-spool engine further comprises an accessory gear box (AGB) drivingly connected to the second shaft segment of the HP spool, the LP compressor disposed axially between the HP compressor and the AGB.

13. The multi-spool gas turbine engine defined in claim 12, wherein the second shaft segment extends centrally through the LP compressor into the AGB.

14. The multi-spool gas turbine engine defined in claim 12, wherein the inter-shaft bearing comprises an oil feed tube mounted axially inside the LP shaft.

15. The multi-spool gas turbine engine defined in claim 12, wherein the engine is a reverse flow engine, the LP turbine being disposed forward of the LP compressor relative to a direction of travel of the engine, the HP compressor disposed forward of the LP compressor and in fluid communication therewith, and the HP turbine disposed aft of the LP turbine and in fluid communication therewith.

16. The multi-spool gas turbine engine defined in claim 12, wherein the LP shaft has a power turbine shaft portion extending forwardly of the LP turbine and an LP compressor shaft portion extending rearwardly from the LP turbine to a location aft of the LP compressor.

17. The multi-spool gas turbine engine defined in claim 12, wherein the HP shaft comprises first and second shaft segments drivingly connected by a coupling disposed axially between the HP compressor and the LP compressor, the first shaft segment extending axially between the HP turbine and the HP compressor, and wherein the inter-shaft bearing is mounted to the second shaft segment.

18. The multi-spool gas turbine engine defined in claim 17, wherein the coupling is a flexible coupling.

19. A multi-spool gas turbine engine comprising: a low pressure (LP) spool; a high pressure (HP) spool, the LP spool and the HP spool rotatable independently of one another about an engine axis; the LP pressure spool comprising an LP compressor, an LP turbine and an LP shaft for transferring a torque from the LP turbine to the LP compressor; the HP spool comprising an HP turbine and an HP compressor; an accessory gear box (AGB) drivingly connected to the HP spool via an AGB input shaft, the LP shaft extending axially inside the AGB input shaft, the LP compressor disposed axially between the HP compressor and the AGB, and an inter-shaft bearing radially between the LP shaft and the AGB input shaft.

20. The multi-spool engine defined in claim 19, wherein the HP spool comprises an HP shaft for transferring a torque from the HP turbine to the HP compressor, and wherein the AGB input shaft is drivingly connected to the HP shaft via a flexible coupling.

21. The multi-spool engine defined in claim 19, wherein the HP spool comprises an HP shaft for transferring a torque from the HP turbine to the HP compressor, and wherein a coupling is provided axially between the HP compressor and the LP compressor to drivingly connect the HP shaft to the AGB input shaft.

* * * * *